US012717000B2

(12) United States Patent
Horn

(10) Patent No.: US 12,717,000 B2
(45) Date of Patent: Aug. 25, 2026

(54) METHOD AND DEVICE FOR SCANNING DISTANCE AND VELOCITY DETERMINATION

(71) Applicant: Carl Zeiss AG, Oberkochen (DE)

(72) Inventor: Jan Horn, Mñchen (DE)

(73) Assignee: Carl Zeiss AG, Oberkocken (DE)

( * ) Notice: Subject to any disclaimer, the term of this patent is extended or adjusted under 35 U.S.C. 154(b) by 1185 days.

(21) Appl. No.: 17/547,877

(22) Filed: Dec. 10, 2021

(65) Prior Publication Data

US 2022/0099800 A1 Mar. 31, 2022

Related U.S. Application Data

(63) Continuation of application No. PCT/EP2021/069954, filed on Jul. 16, 2021.

(30) Foreign Application Priority Data

Jul. 16, 2020 (DE) .................... 10 2020 118 789.0

(51) Int. Cl.
*G01S 7/48* (2006.01)
*G01S 17/32* (2020.01)
(Continued)

(52) U.S. Cl.
CPC ............ *G01S 7/4808* (2013.01); *G01S 17/32* (2013.01); *G01S 17/58* (2013.01); *G01S 17/89* (2013.01)

(58) Field of Classification Search
CPC ........ G01S 7/4808; G01S 17/32; G01S 17/58; G01S 17/34
See application file for complete search history.

(56) References Cited

U.S. PATENT DOCUMENTS 6,317,073 B1 11/2001 Tamatsu et al.
10,209,360 B2 2/2019 Price et al.
(Continued)

FOREIGN PATENT DOCUMENTS

EP 3495841 A1 * 6/2019 .......... G01S 13/931
JP 2017203671 A * 11/2017
(Continued)

OTHER PUBLICATIONS

Lowe, Distinctive Image Features from Scale-Invariant Keypoints, Computer Science Dept., University of British Columbia, Jan. 10, 2003, 20 pgs.
(Continued)

*Primary Examiner* — Yuqing Xiao
(74) *Attorney, Agent, or Firm* — Morgan, Lewis & Bockius LLP

(57) ABSTRACT

In a method for scanning distance and velocity determination of at least one object, a light source emits an optical signal with a time-varying frequency. A first difference frequency distribution is determined that represents, for different pixels on the at least one object, a difference frequency between a measurement signal originating from the optical signal and reflected at the respective pixel and a reference signal not reflected at the object. At a later time, a second difference frequency distribution is determined. Then the first and the second difference frequency distributions are aligned by performing a transformation of the pixels of the first and of the second difference frequency distributions in such a way that after this alignment, pixels corresponding to each other both distributions correspond to the same object point. Finally, the distance and velocity for each pixel is determined using the two aligned difference frequency distributions.

8 Claims, 11 Drawing Sheets

(51) Int. Cl.
*G01S 17/58* (2006.01)
*G01S 17/89* (2020.01)

(56) References Cited

U.S. PATENT DOCUMENTS

2004/0252047 A1* 12/2004 Miyake ................ G01S 13/931
342/107
2018/0024246 A1 1/2018 Jeong et al.
2020/0182978 A1 6/2020 Maleki et al.

FOREIGN PATENT DOCUMENTS

JP 2018197697 A * 12/2018
WO WO 2020018805 A1 1/2020

OTHER PUBLICATIONS

Carl Zeiss AG, Office Action, German Application No. 10 2020 118 789.0, Feb. 8, 2021, 12 pgs.
Zeiss AG, International Search Report and Written Opinion, PCT/EP2021/069954, Oct. 26, 2021, 13 pgs.

* cited by examiner a)

b)

c)

METHOD AND DEVICE FOR SCANNING DISTANCE AND VELOCITY DETERMINATION

CROSS REFERENCE TO RELATED APPLICATIONS

This application is a continuation application of international application No. PCT/EP2021/069954 filed Jul. 16, 2021 that claims priority of German patent application No. 10 2020 118 789.0 filed Jul. 16, 2020. The contents of both earlier applications are incorporated herein by reference in their entireties.

BACKGROUND OF THE INVENTION

1. Field of the Invention

The invention relates to a method and a device for scanning distance and velocity determination of at least one object. The method or device can be used to determine distances of both moving and non-moving objects and, in particular, to determine the topography or shape of a spatially extended three-dimensional object.

2. Description of the Prior Art

For the optical distance measurement of objects, a measuring principle also known as LIDAR is known, in which an optical signal is emitted to the object in question and evaluated after back reflection from the object. In practice, both time-of-flight-based measuring systems (TOF-LIDAR measuring systems, TOF=time of flight), in which the time-of-flight of the laser light to the respective object and back is measured directly, and FMCW-LIDAR measuring systems with the use of a frequency-modulated FMCW laser (FMCW=frequency-modulated continuous wave) are used.

FIG. 6A shows only a schematic representation of a principle structure known per se, in which a signal 611 emitted by a light source 610 with a time-varying frequency (also referred to as chirp) is split into two partial signals, this splitting being effected, for example, via a beam splitter (e.g., a partially transparent mirror or a fiber-optic splitter) which is not shown. The two partial signals are coupled via a signal coupler 645 and superimposed on one another at a detector 650, the first partial signal reaching the signal coupler 645 and the detector 650 as a reference signal 622 without reflection from the object designated 640.

The second partial signal arriving at the signal coupler 645 or at the detector 650, on the other hand, runs as a measurement signal 621 via an optical circulator 620 and a scanner 630 to the object 640, is reflected back by the latter and thus reaches the signal coupler 645 and the detector 650 with a time delay and correspondingly changed frequency compared to the reference signal 622. By an evaluation device 660, the detector signal supplied by the detector 650 is evaluated relative to the measuring device or the light source 610, the difference frequency between the measuring signal 621 and the reference signal 622 detected at a specific time being characteristic of the distance of the object 640 from the measuring device or the light source 610. Thereby, in order to obtain additional information with respect to the relative velocity between the object 640 and the measuring device or the light source 610, the time-dependent frequency characteristic of the signal 611 emitted by the light source 610 can also be such that two sections or partial signals are present in which the time derivative of the frequency generated by the light source 610 is opposite to each other, whereby the corresponding sections or partial signals can then be referred to as up-chirp and down-chirp.

From the difference or beat frequencies determined for these two partial signals, both the Doppler shift $f_D$ as well as the beat frequency corrected with respect to the Doppler effect $f_b$ are calculated as follows:

$$f_b = \frac{f_{bd} + f_{bu}}{2} \tag{1}$$

$$f_D = \frac{f_{bd} - f_{bu}}{2} \tag{2}$$

where $f_{bu}$ is the beat frequency during the up-chirp and $f_{bd}$ denotes the frequency during the down-chirp.

In FIG. 6B, both the time dependency of the frequency and the time dependency of the frequency are shown for the measurement signal 621 and the reference signal 622. $f_L$ as well as the time dependence of the frequency $f_s$ of the detector signal, which corresponds to the respective beat frequency $f_{bu}$, $f_{bd}$ during the up-chirp and during the down-chirp, respectively. The relationship between the object distance d and the beat frequency corrected for the Doppler effect $f_b$ is then given by $$f_b = 2 * \kappa * d/c \tag{3}$$

where κ denotes the chirp rate of frequency tuning and c the speed of light.

FIG. 7 shows, starting from the structure described above with reference to FIGS. 6A to 6B, a schematic representation for explaining the signal flow during distance or speed calculation. Here, the block designated 700 (FMCW device) comprises all components shown in FIG. 6A except for the scanner 630, i.e., the light source 610, the optical circulator 620, the signal coupler 645, the detector 650 and the evaluation device 660. Between this block or the FMCW device 700 and the scanner designated 730 in FIG. 7, the transmission of the respective optical (measurement) signals may be implemented, for example, waveguide-based on a photonic integrated circuit (PIC). Via the evaluation device present within the FMCW device 700, the calculation of the distance and velocity data is carried out directly on the basis of the beat or difference frequencies (between measurement and reference signal), and on this basis, via a block 760, a corresponding scene image calculation is carried out, providing a distance image and a velocity image.

However, a problem that arises in practice is that the distance and velocity determination described above is based on assumptions that may not be fulfilled, at least in part: Specifically, the above calculations are based, on the one hand, on the assumption that the respective measurement signals used for the beat frequencies during the up-chirp and during the down-chirp come from the same beam direction or from the same object location. Furthermore, the above calculations are also based on the assumption that the duration of the respective up-chirp or down-chirp is sufficiently short to be able to assume a constant speed of the object in the respective beam direction or a constant object distance.

In particular, the above-mentioned assumption of matching beam directions or object locations of the measurement signals used for the up-chirp and the down-chirp is no longer justified in scenarios in which, for example, as a result of a comparatively fast movement taking place within the scene under consideration, e.g., the measurement signal during the up-chirp still comes from a vehicle, but during the down-chirp—due to further movement of the vehicle in the meantime—already comes from another object (e.g., a building). For example, as a result of a comparatively fast movement within the scene under consideration, the measurement signal is still reflected by a vehicle during the up-chirp, but is already reflected back by another object (e.g., a building, tree, etc.) during the down-chirp as a result of further movement of the vehicle in the meantime.

Furthermore, the assumption of coinciding beam directions also proves to be incorrect in scenarios in which the scanning device used to scan the object itself causes the respective measuring beam to move further during the scanning process, because, for example, the scanning device uses a mechanically movable deflection mirror in combination with a dispersive optical element for the purpose of implementing a two-dimensional scanning process.

Since, in the scenarios described above, the frequencies used for the calculation of the beat frequencies $f_{bu}$, $f_{bd}$ ultimately originate from different beam directions or from different object points, an incorrect interpretation of the measurement results and thus an incorrect detection of the scene under consideration is the consequence.

FIG. 8 shows only schematic and highly simplified sketches to illustrate the above considerations.

FIG. 8, section a shows a scenario in which no movement takes place in the scene under consideration and the beat or difference frequencies obtained for both the up-chirp and the down-chirp are assigned to the same beam direction of the measurement signal or to corresponding object points. FIG. 8, section b corresponds to a scenario in which the object or vehicle under consideration moves from left to right, and FIG. 8, section c shows a scenario in which, in addition to the object movement of FIG. 8, section b, a further movement of the respective measuring beam occurs during the scanning process. While in the scenario of FIG. 8, section a, an error-free imaging of the scene is given, for the scenarios of FIG. 8, section b and FIG. 8, section c, an erroneous detection results.

Regarding the state of the art, reference is made to the publications D. Lowe: "Distinctive image features from scale-invariant keypoints", International Journal of Computer Vision 60 (2004), No. 2, pp. 91-110 and C. Stiller et al.: "The computation of motion", in: T. Reed (ed.): "Digital Image Sequence Processing, Compression and Analysis", CRC Press (2005), pp. 73-108.

SUMMARY OF THE INVENTION

Against the above background, it is an object of the present invention to provide a method and a device for scanning distance and velocity determination of at least one object, which enable the most accurate and reliable distance measurement possible while at least partially avoiding the disadvantages described above.

This object is achieved, according to an aspect of the invention, by a method comprising the following steps:

emitting, using a light source, an optical signal with a time-varying frequency;

determining a first difference frequency distribution (e.g., a spatial distribution of difference frequency values) which, for different pixels on the at least one object, indicates in each case the difference frequency between a measurement signal originating from the optical signal and reflected at the respective pixel and a reference signal not reflected at the object;

determining a second difference frequency distribution (e.g., a spatial distribution of difference frequency values) which, for different pixels on the at least one object, indicates in each case the difference frequency between a measurement signal originating from the optical signal and reflected at the respective pixel and a reference signal not reflected at the object;

aligning the first and second difference frequency distributions by performing a transformation of the respective sample points (pixels) of the first and/or second difference frequency distributions such that, after this alignment, pixels corresponding to each other in the two difference frequency distributions originate from the same object point; and determining the distance and velocity for each of these pixels on the at least one object using the two aligned difference frequency distributions.

In particular, the invention is based on the concept that the beat frequencies determined on the detector side for the sections or partial signals with different time dependencies of the frequency generated by the light source (i.e., in particular for up-chirp and down-chirp) are not used directly for distance or velocity determination (on the basis of the formulae (1) and (2) given at the beginning).

Rather, according to the invention, the distribution of difference frequency values obtained for the up-chip and/or the distribution of difference frequency values obtained for the down-chirp are first matched to one another in such a way that the difference frequency values corresponding to one another in the correspondingly matched distributions originate from measurement signals that were reflected from one and the same location on the object or within the scene under consideration. In other words, the sample points in both difference frequency distributions are aligned so that the respective information from pixels corresponding in the two distributions originates from the same object point.

According to one embodiment, performing the transformation comprises coregistering between the first and second difference frequency distributions.

According to the invention, the said difference frequency distributions can each be interpreted as an image in their own right, so that the said matching can be brought into agreement with one another by means of coregistration (i.e., using a method of image processing known in its own right) to the extent that the respective corresponding image regions correspond to the same pixels on the object.

By now using difference frequency values for the distance or velocity determination only after the adaptation or coregistration described above, it is ensured according to the invention that the information ultimately used from the up-chirp and the down-chirp for the calculation of a certain distance and velocity value also originates from one and the same pixel on the object (or from the same location within the scene under consideration).

With renewed reference to the above-mentioned interpretation of the two difference frequency distributions determined in accordance with the invention as images, the performance of coregistration in the invention means that, prior to the actual distance and velocity calculation by way of image processing, a transformation of at least one of the two images is performed in such a way that both images are brought into coincidence (so that the respective pixels or object locations for both images are superimposed) prior to the calculation of the difference frequencies.

According to one embodiment, the measurement signals used for determining the first difference frequency distribution and the measurement signals used for determining the second difference frequency distribution differ from each other with respect to the time dependence of the frequency of the optical signal used.

According to one embodiment, the transformation performed to align the first and second difference frequency distributions is a non-affine transformation. In other words, the transformation performed to align the first and second difference frequency distributions goes beyond a pure affine transformation (which includes shifts, scales, rotations, shears, and combinations thereof) so that the transformation is also non-rigid.

According to one embodiment, the transformation performed to align the first and second difference frequency distributions is calculated based on the difference frequency distributions.

According to one embodiment, the transformation performed for aligning the first and the second difference frequency distribution is calculated based on the respective signal strength distributions belonging to the difference frequency distributions. In this case, the signal strength distributions belonging to the difference frequency distributions can be used in addition or alternatively to the actual difference frequency distributions for the alignment or the calculation of the transformation to be performed for this purpose.

Thus, in embodiments of the invention, the previously described image adjustment is not (or not solely) performed taking into account the peak positions in the respective difference frequency distributions, but additionally or alternatively also taking into account the respective peak heights. Said peak heights ultimately represent the reflectivity of the object (and thus the brightness in a corresponding grayscale image), so that grayscale images of the scene under consideration can also be obtained as additional information and used to improve the matching performed.

According to one embodiment, a distance image and a velocity image of a scene are computed, wherein each pixel within the distance image and velocity image respectively represents a distance value and a velocity value within the scene.

The invention also relates to a device for scanning distance and speed determination of at least one object, which is configured for carrying out a method having the features described above. For advantages and advantageous embodiments of the device, reference is made to the above explanations in connection with the method according to the invention.

BRIEF DESCRIPTION OF THE DRAWINGS

Various features and advantages of the present invention may be more readily understood with reference to the following detailed description taken in conjunction with the accompanying drawings in which.

DETAILED DESCRIPTION OF EMBODIMENTS

In the following, the structure and mode of operation of a device according to the invention are described in exemplary embodiments with reference to the schematic illustrations in FIGS. 1-5 and 9-12.

1. First Embodiment

Figure 6A:
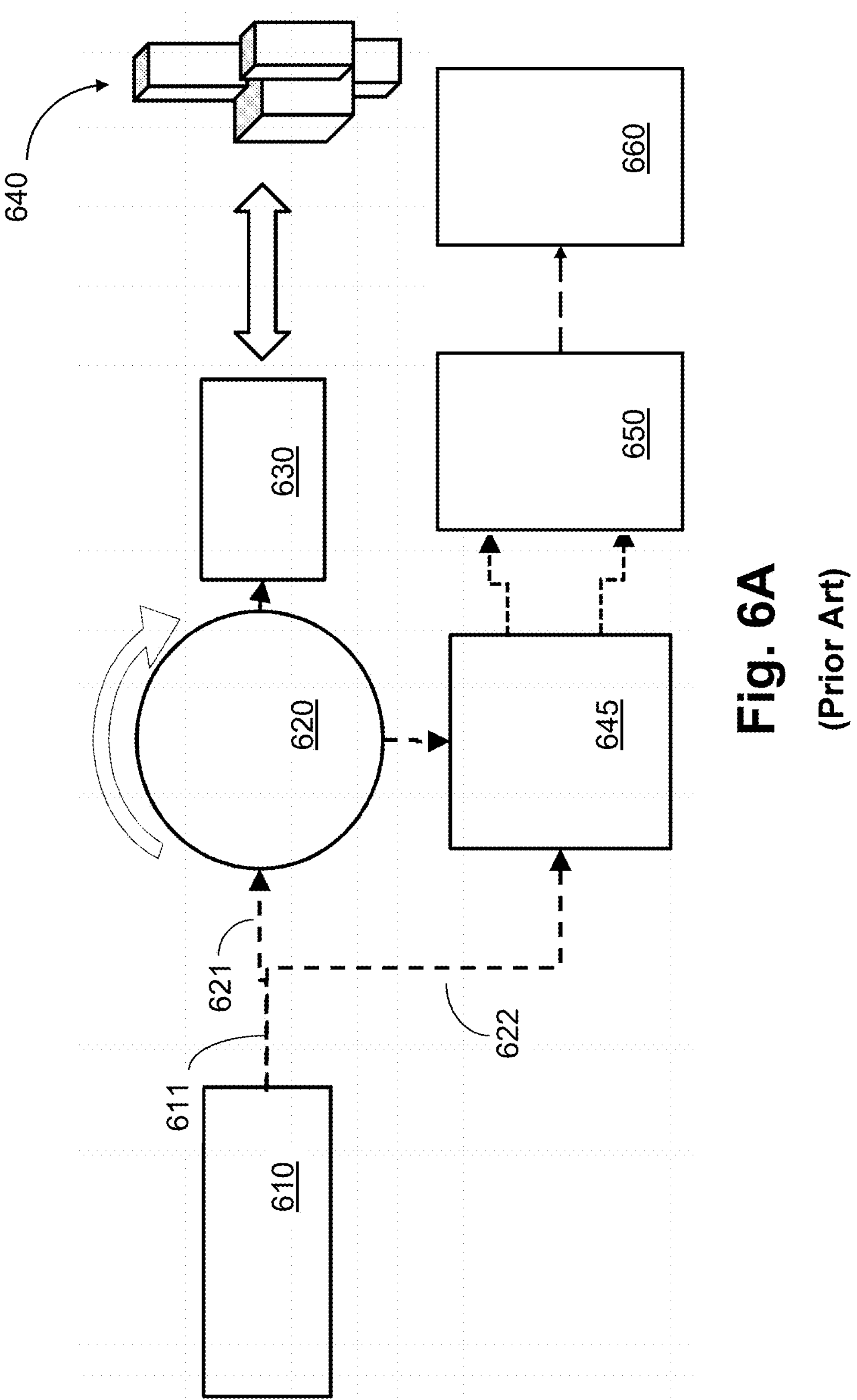
FIGS. 6A-B, 7 are schematic illustrations explaining a conventional method or device for determining distance and speed.

The block marked 100 (FMCW device) comprises the conventional components light source, optical circulator, signal coupler and detector as shown in FIG. 6A. The light source comprises a frequency-modulated continuous wave (FMCW) laser for emitting a time-varying frequency (chirp) optical signal. The laser may be, for example, a distributed feedback (DFB) laser, a whispering gallery mode resonator (WGMR) laser, or a vertical-cavity surface-emitting laser (VCSEL) laser. Between the FMCW device 100 and the scanner designated 130 in FIG. 1, the transmission of the respective optical (measurement) signals can be implemented, for example, on a waveguide basis on a photonic integrated circuit (PIC).

Figure 6B:
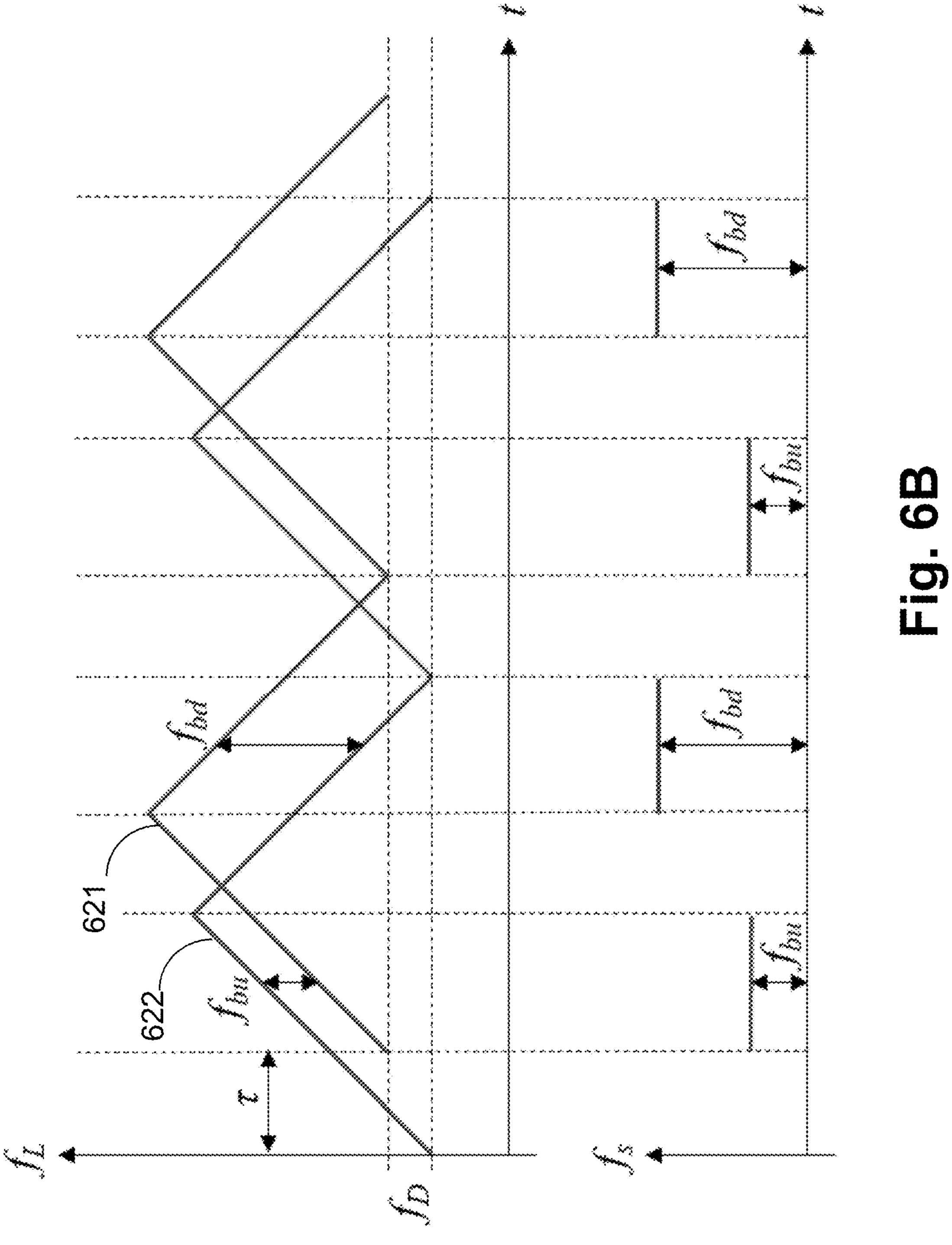
Figure 7:
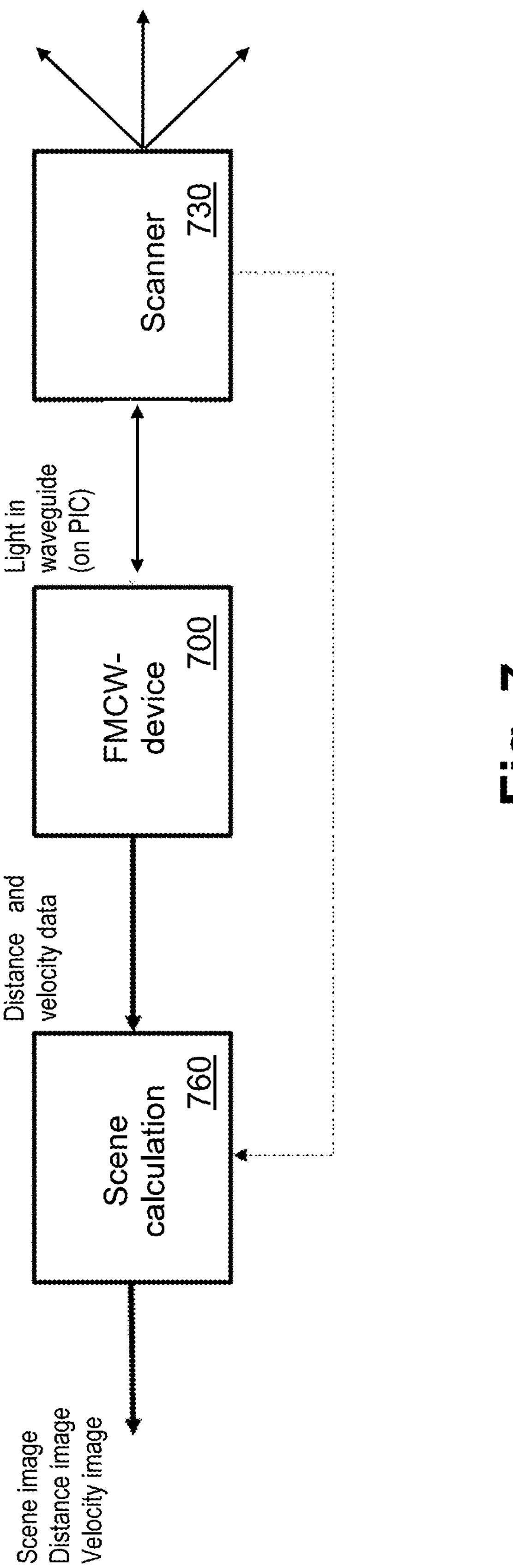
Figure 8:
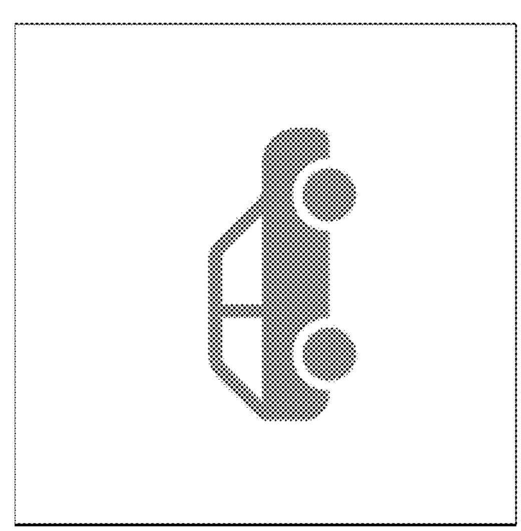
FIG. 8 shows schematic sketches illustrating a problem underlying the present invention
Figure 8:
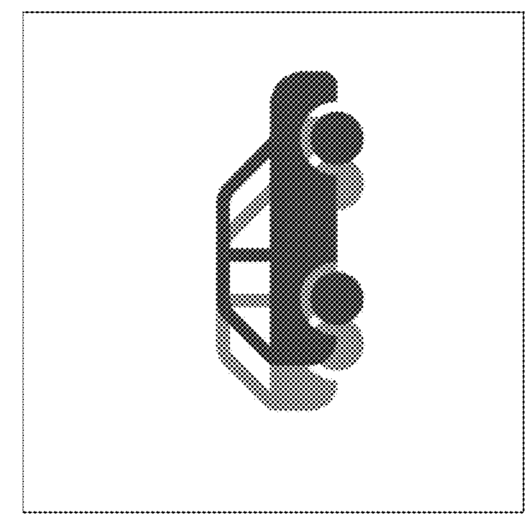
Figure 8:
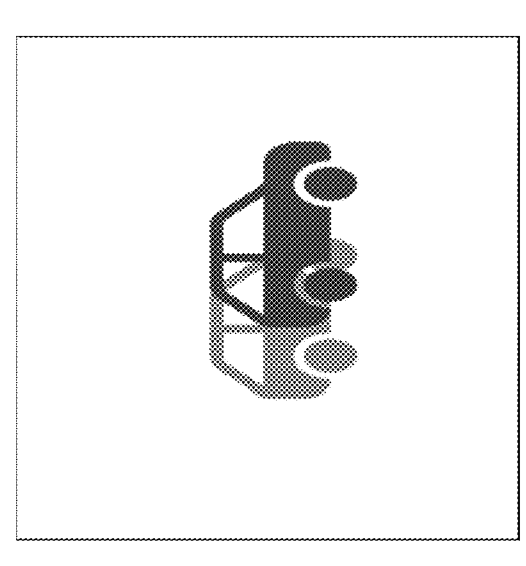

Furthermore, the FMCW device 100 also comprises a simplified evaluation device which determines beat frequencies and corresponding beat or difference frequency distributions based on the detector signal provided by the detector but, unlike the conventional concept of FIGS. 6-7, does not yet perform distance and velocity determination directly on these difference frequency distributions.

The embodiments described in the following with reference to FIGS. 1-5 and 9-12 have in common that the distance and velocity determination of an object or the corresponding scene image calculation, in contrast to the conventional concept shown in FIGS. 6A-6B and FIG. 7, is not carried out directly based on the difference frequency distributions for up-chirp and down-chirp determined with the FMCW device 100, but instead an approximation of these difference frequency distributions described in the following is carried out first.

Figure 1:
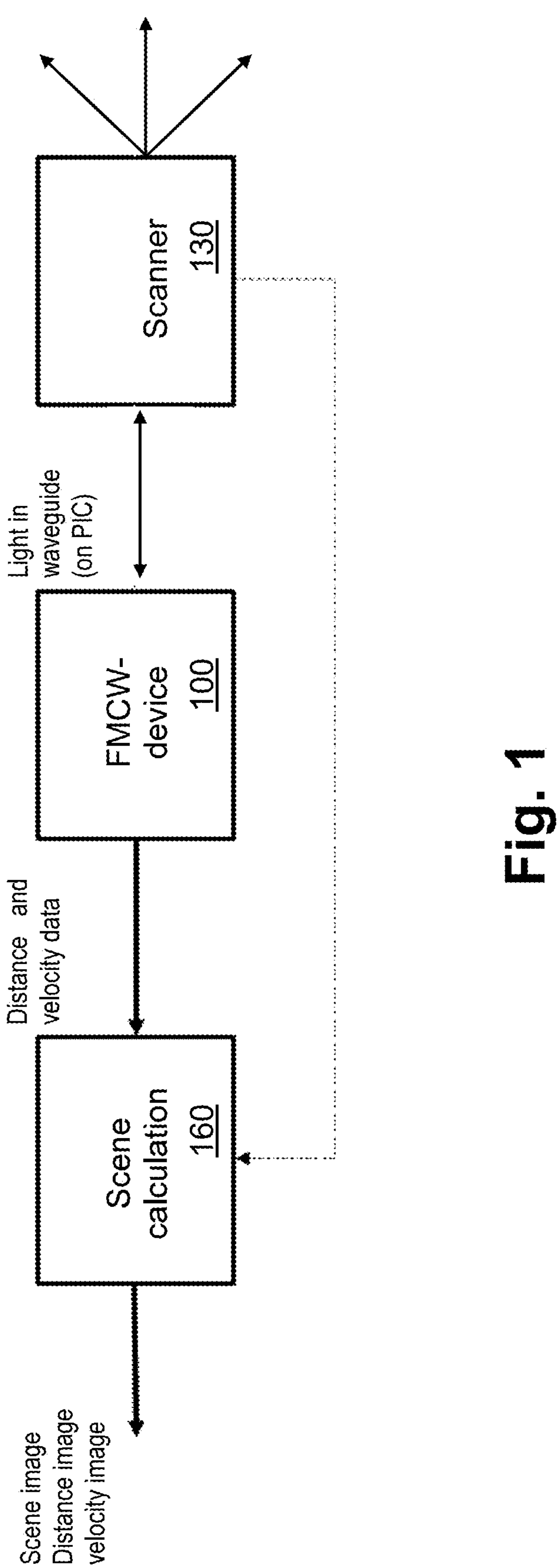
FIGS. 1-3 are schematic illustrations explaining a method or device according to the invention for determining distance and speed in a first embodiment.

Referring first to FIG. 1, the FMCW device 100 thus first provides separate beat frequency images or difference frequency distributions for both the up-chirp and the down-chirp.

Figure 2:
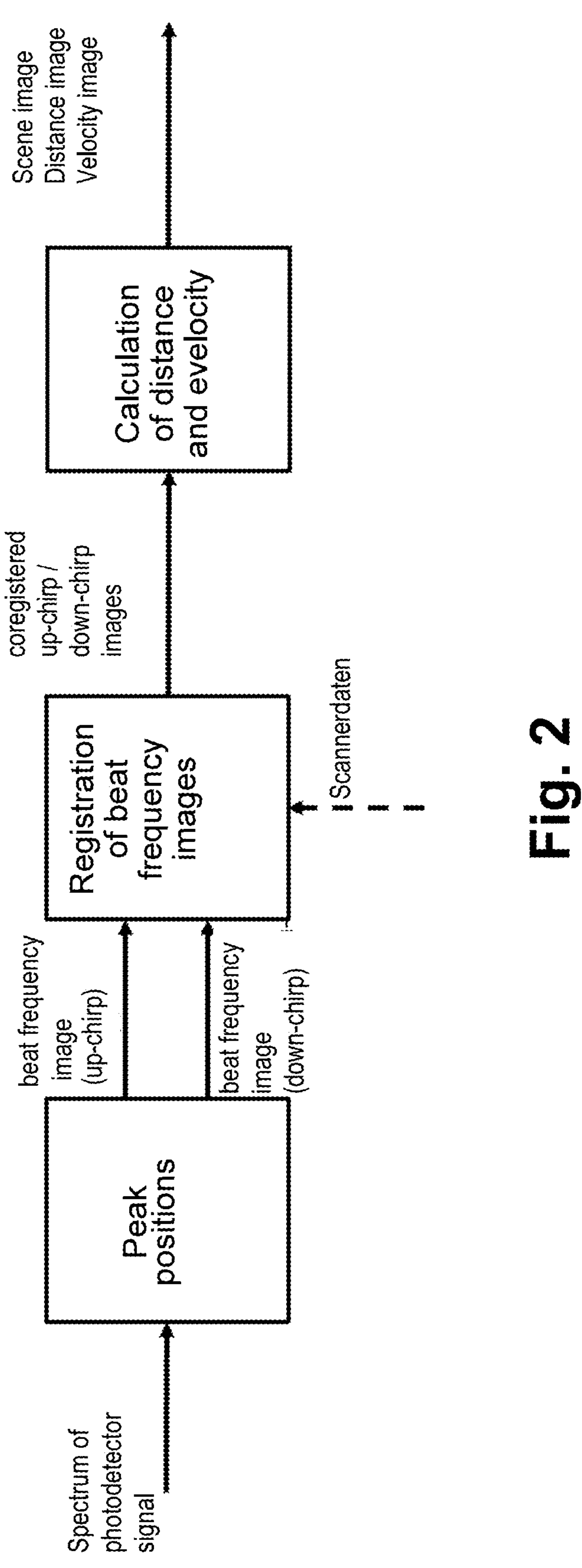
Figure 3:
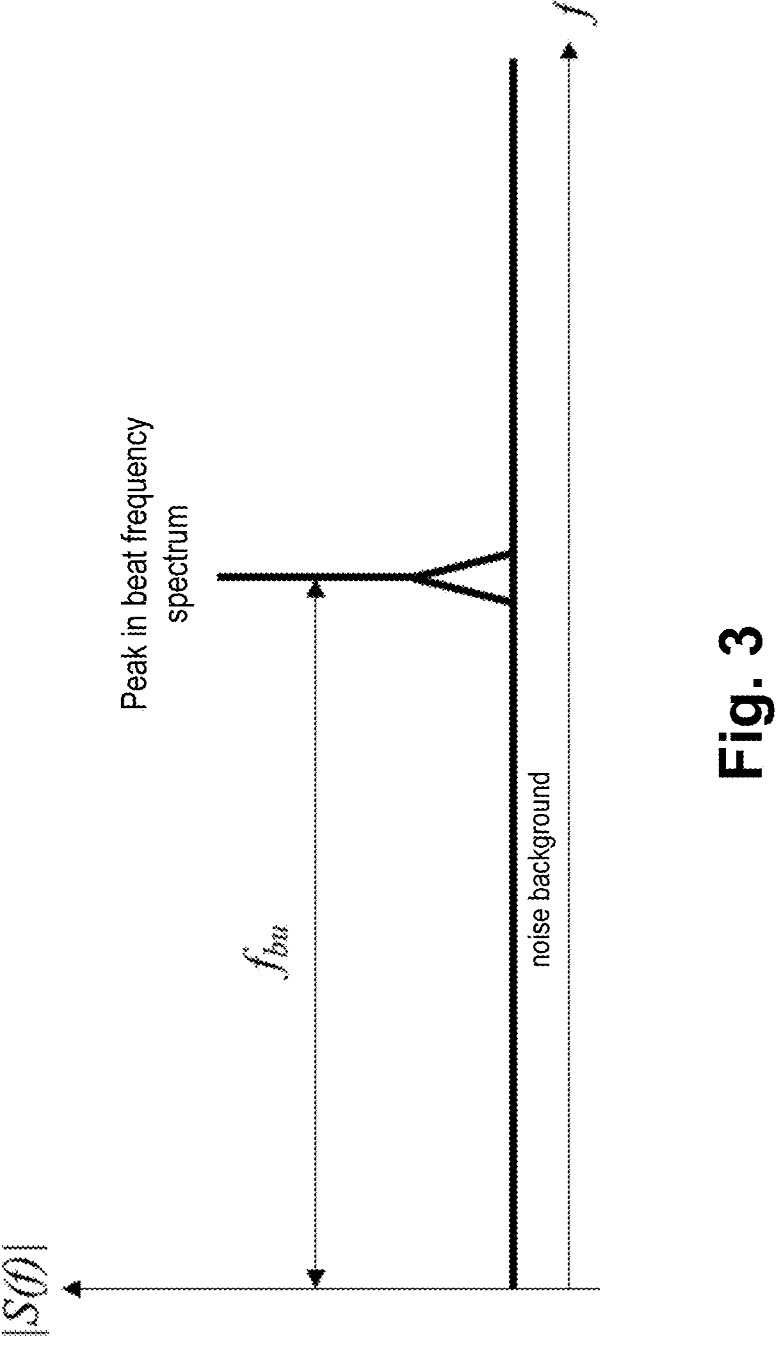

Then, according to the invention, the two difference frequency distributions (i.e., the beat frequency images for up-chirp and down-chirp) are first aligned, which corresponds to a registration of the respective beat frequency images according to FIG. 2. This alignment or registration involves performing a transformation of the first and/or the second difference frequency distribution, which in the embodiment example of FIGS. 1-3 is calculated based on the difference frequency distributions themselves (i.e., the respective peak positions in the detector signal spectra).

Regarding methods of registration known as such, reference is made to the publications D. Lowe: "Distinctive image features from scale-invariant keypoints", International Journal of Computer Vision 60 (2004), No. 2, pp. 91-110 and C. Stiller et al.: "The computation of motion", in: T. Reed (ed.): "Digital Image Sequence Processing, Compression and Analysis", CRC Press (2005), pp. 73-108.

According to the invention, the calculation of the distance and velocity of the object or the determination of the corresponding scene images takes place—as shown in FIG. 2—only on the basis of adjusted or coregistered beat frequency images, so that the problems existing with the conventional approach described at the beginning (with direct use of the non-adjusted difference frequency distributions) and a correspondingly incorrect determination of the scene are avoided.

With the above-mentioned implementation of a transformation of the first and/or the second difference frequency distribution it is meant that alternatively either only one of the two difference frequency distributions can be adapted to the respective other (unchanged) distribution, or also both difference frequency distributions can be transformed in each case and approximated to each other in this way.

In further embodiments of the invention, the calculation of the difference frequency distributions (obtained for up-chirp and down-chirp) for alignment may not (or not solely) be based on the difference frequency distributions themselves or the respective peak positions in the detector signal spectrum (cf. FIG. 3), but additionally or alternatively also based on the signal strength distributions associated with the difference frequency distributions (i.e., based on the peak heights in the respective detector signal spectra, cf. FIG. 5).

Figure 4:
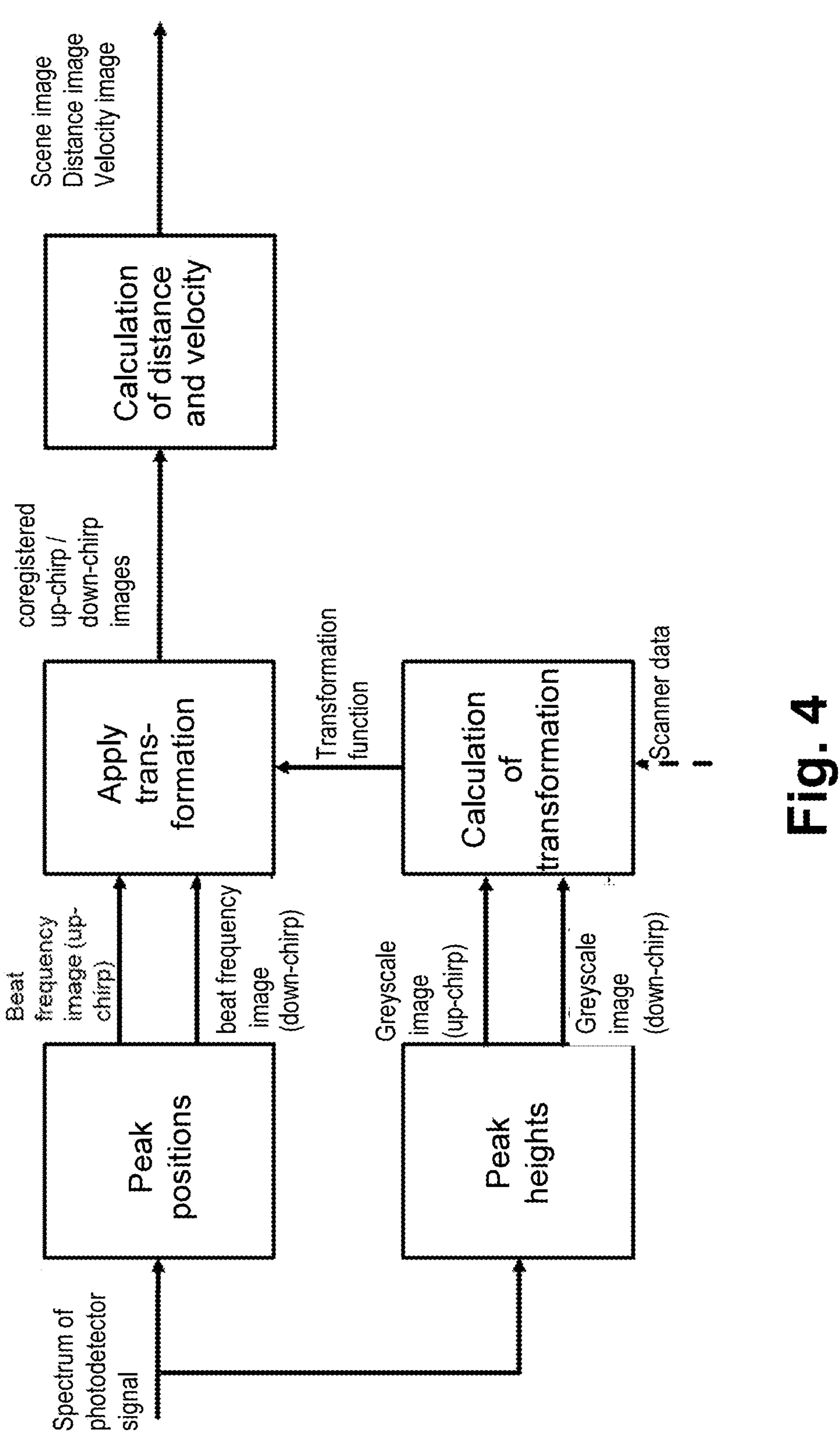
FIGS. 4-5 are schematic representations for explaining a method according to the invention or a device according to the invention for determining distance and speed in a further embodiment.
Figure 5:
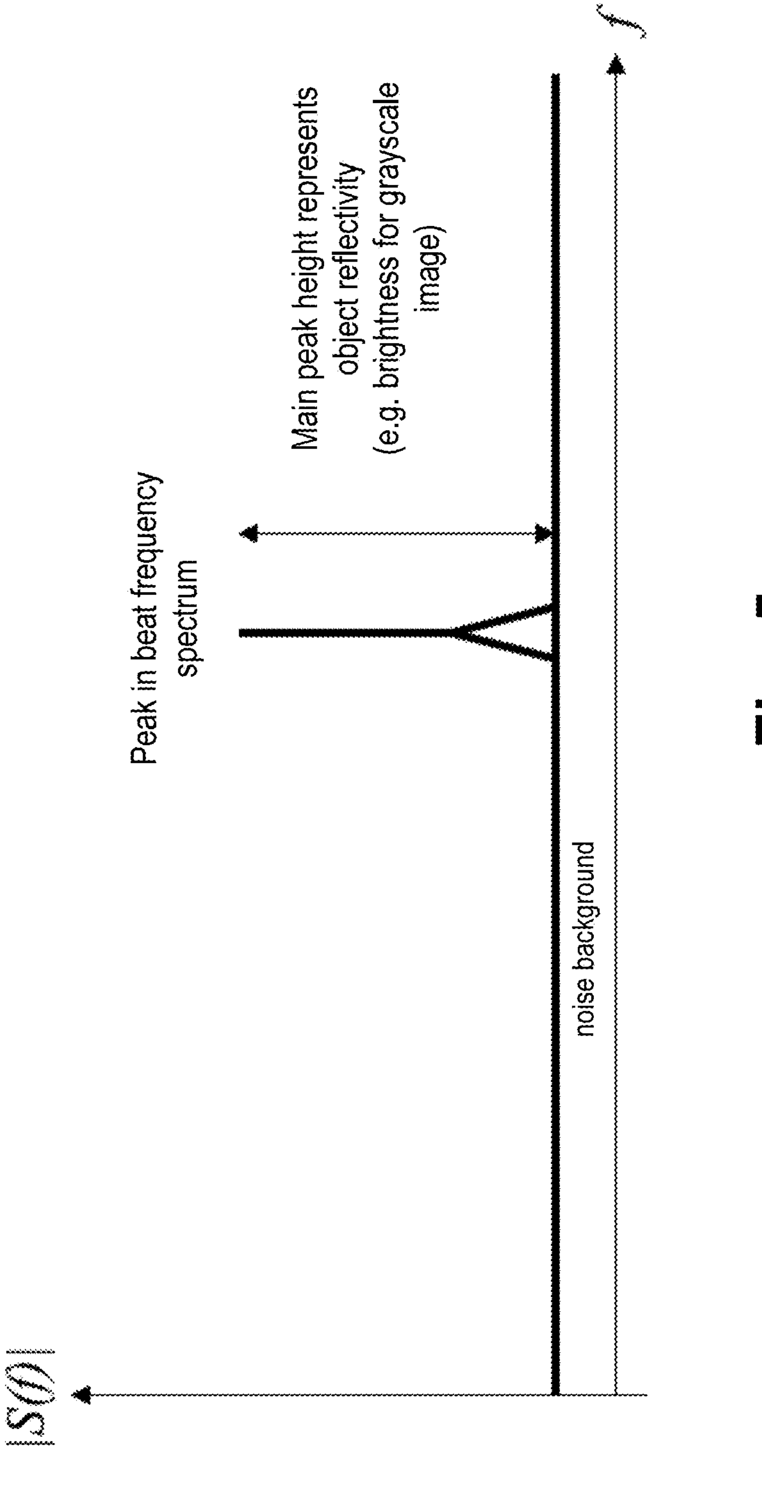

FIG. 4 shows, as a modification of FIG. 2, a diagram according to which the calculation of the above transformation is calculated on the basis of the peak heights in the respective detector signal spectra (i.e., based on the signal strength distributions belonging to the respective difference frequency distributions for up-chirp and down-chirp). The application of the transformation calculated in this way to the beat frequency images determined for up-chirp and down-chirp in turn provides co-registered and correspondingly adjusted beat frequency images or difference frequency distributions, which are then used—in this respect analogously to the embodiment of FIGS. 1-3—for distance and speed calculation and provision of corresponding scene images.

In embodiments of the invention, the aforementioned transformation of at least one of the difference frequency distributions or the corresponding image processing is also performed non-rigidly. In other words, the transformation performed for image matching is not limited to shifts, scales, rotations, shears or perspective transformations.

2. Second Embodiment

The method is particularly advantageous for FMCW LIDAR systems with a dispersive scan axis. Here, the frequency modulation of the laser is used not only for distance measurement but also for moving the scan beam in the scene. For this purpose, a dispersive element (e.g., grating) is used in the scanner. In dispersive scanning LIDAR systems, it is advantageous not to select the individual temporal segments of the frequency modulation (up-chirp or down-chirp) too short in time. At the same time, however, this means that the difference frequency distributions based on these temporal segments can be far apart in time. Now, if movements take place in the scene (e.g., moving vehicle) or if, for example, a second rotating scan axis performs a rotational movement, the positions of objects in the scene are different for the respective emergence of the difference frequency distributions during the temporal segments of the frequency modulation. In other words: During the up-chirp, objects in the image are at a different position than during the down-chirp.

Since the distance and velocity image in FMCW LIDAR results from a point-by-point calculation of difference frequencies in the up-chirp difference frequency distribution and in the down-chirp difference distribution, this leads to erroneous measurement points.

Figure 9:
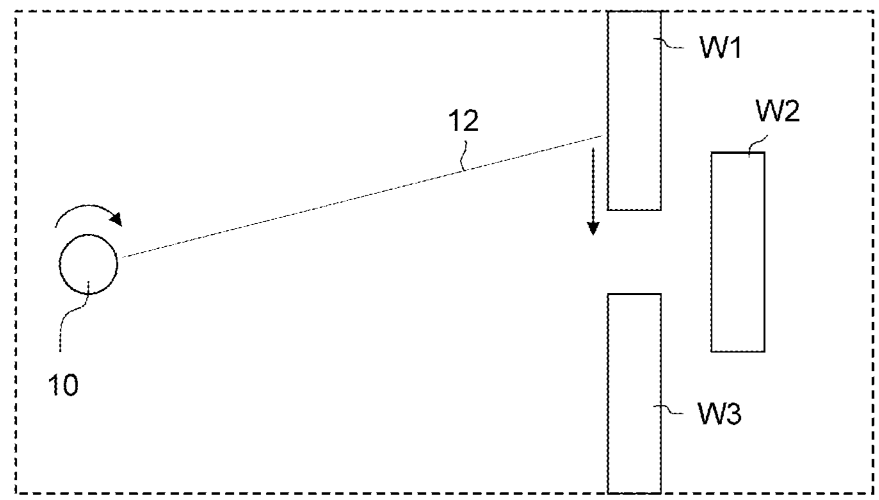
FIG. 9 is a top view of a scene in which a LIDAR scanner according to the invention scans three walls that are at different distances from the scanner.

As a simple example, we assume the scene shown in FIG. 9, in which the LIDAR scanner scans three walls W1, W2 and W3. Wall W2 is slightly further away from the scanner than walls W1 and W3.

The horizontal scan axis is formed by a rotation of a scan mirror 10. The vertical axis is to be formed dispersively. For simplicity, it is assumed that the scan beam 12 travels on the wall through the scanner rotation at a constant speed in the direction indicated by an arrow, i.e., from left to right. Additionally, only one scan beam 12 is considered. With this one scan beam 12, the mechanical scan motion and the second dispersive axis already produce a simple LIDAR image and, as a precursor to this image, two difference frequency distributions.

Figure 10:
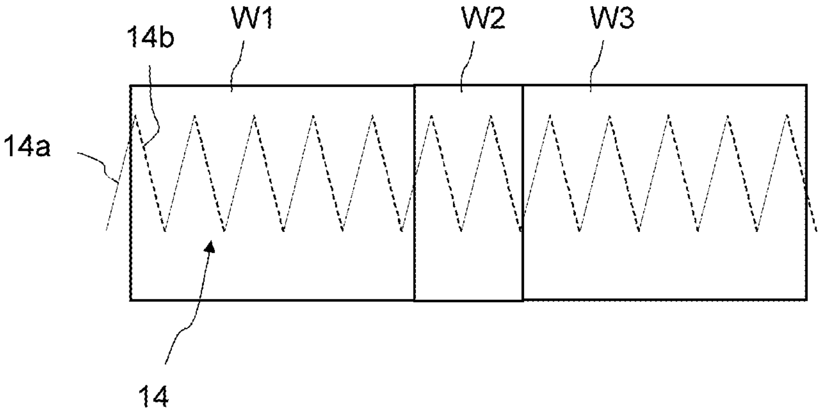
FIG. 10 is a schematic representation of the scan trajectory on the three walls.

As mentioned above, the walls W1 to W3 are scanned in the left-right direction by the rotational movement of the scanning mirror 10; the scanning process in the vertical direction is effected by a dispersive system. Frequency modulation with increasing frequency in first sub-segments (up-chirp) and decreasing frequency in second sub-segments (down-chirp), together with the dispersive element in the scanner, results in a sawtooth-like scan trajectory 14 as shown in FIG. 10. The solid lines 14*a* represent the up-chirp portions and the dashed lines 14*b* represent the down-chirp portions.

Figures 11, 12:
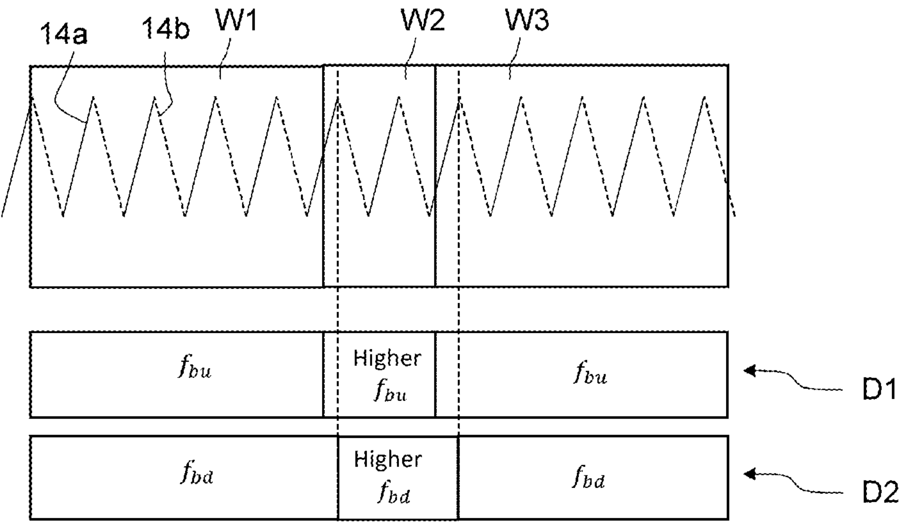
FIG. 11 shows the mutually shifted difference frequency distributions due to the time offset of up-chirp and down-chirp.
FIG. 12 shows the difference frequency distributions after registration.

FIG. 11 illustrates how, due to the time offset of up-chirp and down-chirp, the corresponding parts in the difference frequency distributions D1, D2 are shifted against each other. In this example, a more distant object (wall W2) results in a higher difference frequency than a close object (walls W1 and W3). The difference frequency in the up-chirp is shown in FIG. 11 as $f_{bu}$ and the difference frequency in the down-chirp with $f_{bd}$. Instead of or in addition to the pure displacement shown, the two difference frequency distributions D1, D2 can also be slightly distorted, depending on the scene content.

The edges seen in FIG. 11, i.e., jumps in the difference frequency distributions D1, D2, can be used to register the beat frequency images before calculating distance and velocity. The image registration, with which the edges are superimposed, can be done with common methods of image processing.

FIG. 12 shows the difference frequency distributions D1', D2' after registration. The edges are now completely superimposed. If the registration were not carried out, false measurements would occur at the edges, since values for beat frequencies in the up-chirp and down-chirp that do not match would be assigned to each other.

The approaches presented in this example can also be applied to more complex scenes that are captured with multiple scan beams. In addition to edges, corners in beat frequency images could then also be used, for example, to calculate the transformation required for registering the images.

Instead of using the beat frequency information for registration, it may be advantageous to use the grayscale information that is also available, as explained above with reference to FIG. 4. This has the advantage that also textures can be used for image registration which would not be visible in the beat frequency image. A wall at a constant distance would have a constant value in the beat frequency image. In the grayscale image, which is extracted from the peak heights (cf. FIG. 5), for example, the brightness texture on the wall could also be used for image registration.

If the invention has also been described with reference to specific embodiments, numerous variations and alternative embodiments will become apparent to the person skilled in the art, for example by combining and/or interchanging features of individual embodiments. Accordingly, it is understood by the skilled person that such variations and alternative embodiments are encompassed by the present invention and that the scope of the invention is limited only within the meaning of the appended claims and their equivalents.

The invention claimed is:

1. A method for scanning distance and velocity determination of at least one object, said method comprising the steps of:

emitting, using a light source, an optical signal with a time-varying frequency;

determining a first difference frequency distribution which is formed by a set of first difference frequencies, wherein the first difference frequencies are associated with different pixels on the at least one object, and wherein each first difference frequency denotes a difference between a frequency of a measurement signal, which originated from the optical signal and was reflected at a respective pixel, and a frequency of a reference signal that has not been reflected at the object;

determining, at a later time, a second difference frequency distribution which is formed by a set of second difference frequencies, wherein the second difference frequencies are associated to different pixels on the at least one object, and wherein each second difference frequency denotes a difference between the frequency of the measurement signal and the frequency of the reference signal;

aligning the first difference frequency distribution and the second difference frequency distribution by performing a transformation of the pixels of the first difference frequency distribution and/or of the pixels of the second difference frequency distribution in such a way that after this alignment, pixels corresponding to each other in the first difference frequency distribution and in the second difference frequency distributions correspond to the same object point, wherein performing the transformation comprises coregistering between the first difference frequency distribution and the second difference frequency distribution; and determining the distance and velocity for each pixel on the at least one object using the two aligned difference frequency distributions.

2. The method of claim 1, wherein the measurement signals used for determining the first difference frequency distribution and the measurement signals used for determining the second difference frequency distribution differ from one another with respect to the time dependency of the frequency of the optical signal.

3. The method of claim 1, wherein the transformation that is performed to align the first difference frequency distribution and the second difference frequency distribution is a non-affine transformation.

4. The method of claim 1, wherein the transformation that is performed to align the first difference frequency distribution and the second difference frequency distributions is calculated based on the first difference frequency distribution and on the second difference frequency distribution.

5. The method of claim 1, wherein the transformation that is performed to align the first difference frequency distribution and the second difference frequency distribution is calculated based on signal strength distributions associated with the first and second difference frequency distributions.

6. The method of claim 1, wherein the transformation performed to align the first difference frequency distribution and the second difference frequency distribution is calculated based on the first difference frequency distribution, the second difference frequency distribution and signal strength distributions associated with the first and second difference frequency distributions.

7. The method of claim 1, wherein a distance image and a speed image of a scene are calculated, and wherein each pixel within the distance or speed image-respectively represents a distance or speed value within the scene.

8. A device for scanning distance and velocity determination of at least one object, wherein the device is configured to carry out the method of claim 1.

* * * * *